United States Patent Office 2,921,866
Patented Jan. 19, 1960

2,921,866
PROCESS FOR IMPROVING THE COLOR STABILITY OF POLYURETHANE CELLULAR PRODUCTS

Christopher L. Wilson, Sloatsburg, N.Y.

No Drawing. Application October 9, 1956
Serial No. 614,793

8 Claims. (Cl. 117—98)

This invention relates to a process for treating polyurethane foams to substantially retard the rate of discoloration thereof upon exposure to air, and the resultant treated foam.

Flexible or semi-flexible cellular products having either closed or open cells, have been manufactured during the last few years by the reaction of a molecule having terminal hydroxyl groups or a combination of hydroxyl and carboxyl groups where the carboxyl number is not more than about 25, with a diisocyanate and water. Such reaction may further include a catalyst such as a tertiary amine; dispersing agents; and pigments, if desired. The major reactant may be a glycol, a polyester or a polyether glycol.

The reactants may be mixed together in a single step procedure, or the diisocyanate may be first combined with the major reactant to produce what is termed a prepolymer. The prepolymer is then, in a separate step, mixed with water. Water causes the evolution of carbon dioxide and the prepolymer molecules join together with the formation of urea linkages.

Specific major reactants used to produce flexible and semi-flexible foams, generally known as polyurethane foams, include glycols; polyhydroxy compounds such as castor oil; polyesters such as those formed by the condensation of a glycol with a dibasic acid; alkyd resins made by the esterification of a dibasic acid with a polyhydroxy compound such as glycerol, pentaerythritol or trimethylol-propane; and polyether glycols such as polyethylene, polypropylene, polybutylene or polytetramethylene ether glycols. The diisocyanates commonly used in the formation of polyurethane foams include the phenylene, tolylene (mixed 2,4- and 2,6-isomers), hexamethylene, diphenylmethane 4, 4′, m-xylylene diisocyanates, and others.

As normally made, the polyurethane foam material is white or lightly colored; or it may be deliberately colored in desired shades by the incorporation during manufacture, of suitable pigments or dyes; or the foam may be colored after manufacture by treatment with substantive or acid dyestuffs. Unfortunately, after manufacture and during exposure to air, the foam undergoes a progressive discoloration and yellowing. This is particularly evident when aromatic diisocyanates have been used in the production of the foam. Although such discoloration and yellowing does not affect the physical properties of the foam, such as tensile and tear strength, compression molulus, etc., the yellowed appearance of the foam is aesthetically undesirable.

It is believed that the yellowing of polyurethane foams is due to the oxidation, strongly catalyzed by light and bases, of constituents containing free amino groups. Wrapping the foam material in cellophane or polyethylene sheeting, or storing the foam in the dark, greatly retards the discoloration of the foam. However, such precautions are not always practicable.

It has been found that the rate of discoloration or yellowing of polyurethane foams is greatly retarded by treating the finished foam with compounds such as formaldehyde, ketene, acetic anhydride, ethylene oxide or mono-isocyanates. The last mentioned class of compounds has been found to be particularly effective and best results have been obtained using a mono-isocyanate either in solution or in vapor form.

The dry polyurethane foam is preferably treated under conditions which completely exclude moisture. Various mono-isocyanates may be used, providing that they are either soluble in a suitable solvent or have an appreciable vapor pressure. The treatment may be accelerated by raising the temperature or, when using aliphatic mono-isocyanates, adding a catalyst thereto in the form of a tertiary base such as triethylamine, methylmorpholine, or the like, in which case both the mono-isocyanate and the catalyst should be either soluble in the solvent selected or should be quite volatile.

The mono-isocyanates used in the treatment of this invention, may be aliphatic, such as the methyl, ethyl, propyl, butyl, octyl, octadecyl, or homologous mono-isocyanates; and including substituted aliphatic mono-isocyanates containing halogen or methoxyl groups; cycloaliphatic compounds such as the cyclopropyl, cyclohexyl or cyclopentyl mono-isocyanates; araliphatic compounds such as the alkyl substituted benzyl mono-isocyanates; and aromatic compounds such as the phenyl mono-isocyanate and its derivatives containing substituents such as alkyl, chloro, bromo, fluoro or alkoxyl groups in the benzene ring. The $\alpha$ and $\beta$ naphthalene mono-isocyanates have also been found effective.

When the treatment of the polyurethane foam material takes the form of exposing the same in an enclosed chamber to the vapors of the mono-isocyanate, the lower alkyl, phenyl and tolyl mono-isocyanates are particularly useful, such treatment being particularly appropriate for fabricated articles of foam such as pads, sheets, cushions, toys or display items. In such cases, the vapor of the mono-isocyanate reacts first and most rapidly with the surface portions of the foam where discoloration normally occurs at an accelerated rate. The vapor reacts more slowly with the interior portions of the foam due to the necessity for diffusing the vapor into the cell structure of the foam. It is apparent, that with a foam having interconnected cells, the rate of diffusion of the mono-isocyanate vapor may be increased by the use of means for positively driving the vapor through the foam cells.

In treating polyurethane foam in the form of large blocks and prior to subdivision or fabrication of articles therefrom, it has been found most desirable to either force the mono-isocyanate vapor through the blocks of material or to thoroughly impregnate the blocks with a solution of the mono-isocyanate. In the latter case, the solvent must be thereafter removed, followed by extraction of residual, unreacted mono-isocyanate as by volatilization or by the use of further solvents. The protection against discoloration and yellowing afforded by the mono-isocyanate treatment is stable and is unimpaired by the application of solvents to the treated foam material.

When using the mono-isocyanates in solution form, it is important that the solvent employed be inert with respect to the mono-isocyanates and not react therewith, and further, the solvent must be in anhydrous form. Suitable solvents for the purpose include benzene, toluene, chloroform, carbon tetrachloride, diethyl ether, tetrahydrofuran and acetone. After treatment with the mono-isocyanate solution for a suitable period of time, the foam is squeezed and residual solvent and unreacted mono-isocyanates are removed from the treated material.

The vapors of mono-isocyanates are irritating and of a lachrymatory nature, which makes it mandatory that all residual traces of the materials are removed before the treated foam is put to use.

To evaluate the various mono-isocyanates in their effect in delaying the yellowing of polyurethane foams, samples of the foams were exposed to mono-isocyanate vapors or solutions for various time intervals at different temperatures, and then subjected to daylight along with other samples of the same foam but untreated. Small specimens of the untreated foam were removed at regular time intervals and preserved in the dark, thereby providing a scale of standard degrees of yellowing in terms of the length of the exposure intervals.

It was found that the mono-isocyanate treated foam samples became discolored at a very slow rate of exposure while the standard, untreated foam samples discolored quite rapidly. Thus, the time period, measured in weeks, for reaching a given standard of discoloration of a treated foam sample, could be a substantial multiple of the time period in which the untreated foam sample achieved the same standard of discoloration. In this manner, the reduction in the rate of discoloration due to the mono-isocyanate treatment, could be fairly well measured or ascertained.

For example, if four weeks exposure was necessary to produce discoloration in a treated sample of polyurethane foam which matched the discoloration in an untreated sample of the same foam attained in one week of exposure to daylight, then it was assumed that the rate of discoloration or yellowing had been reduced by a factor of four. As exposure to light was prolonged over greatly extended time intervals, the treated foam samples tended to attain the color of the untreated samples, but this usually took place only after from ten to fifteen weeks of continuous irradiation of the treated samples.

It was found that protection against rapid discoloration was enhanced with an increase in the period of treatment of the polyurethane foam with the mono-isocyanate. Thus, with exposure of a polyester type of polyurethane foam made with tolylene diisocyanate, to the saturated vapor of phenyl or p-tolyl mono-isocyanate at 20° C. for one hour delayed the yellowing action by about 20%. However, on treating the same foam material with the mono-isocyanate for 5 hours, the rate of yellowing was reduced by about 50%; and when the treatment period was extended to from 20 hours or more, up to 3 days exposure, the yellowing rate was reduced by a factor of about 4.

When a foam of the type indicated above was exposed to a saturated vapor of ethyl mono-isocyanate for 24 hours at 20° within a closed chamber, the rate of yellowing of the treated material was reduced to about one third of the rate for the untreated material.

When using less volatile mono-isocyanates, higher treating temperatures are required. Thus, octyl, o- and p-methoxyphenyl, and m-chlorophenyl mono-isocyanates gave very little protection against rapid yellowing, after one hour of exposure of the polyurethane foam to the saturated vapors of these treating agents at 20° C. Using the same mono-isocyanates at 20° C. for 20 hours, the yellowing rate was reduced by about one half, and when the period of treatment was extended to 3 weeks at the same temperature, the yellowing rate was reduced to one quarter.

On the other hand, the same rate of discoloration indicated in the last example, which provides a reduction in the rate of yellowing by a factor of four, was given to a polyurethane foam of the polyester type after exposing the same in an enclosed chamber to the saturated vapors of 5-cyanopentyl; p-chlorophenyl; α-naphthyl; or m-nitrophenyl mono-isocyanates at 90° C. for one hour.

A sample of polyurethane foam of the polyester type was treated with a 5% chloroform solution of p-chlorophenyl mono-isocyanate at 20° C. for about four hours. The treated foam was removed from the solution, squeezed, washed once with pure chloroform, squeezed again, dried and exposed to daylight. The rate of yellowing was reduced by the foregoing treatment to about one half of that exhibited by the same foam in untreated form.

A polyurethane foam was prepared from polytetramethylene ether glycol having an average molecular weight of approximately 3,000, tolylene diisocyanate (20% 2,4- and 80% 2,6 isomers), and water. After thoroughly heat curing the foam, the material was exposed in a closed chamber to the vapors of ethyl mono-isocyanate at 20° C. for three days. Exposure to light of the treated material showed a reduction in the rate of discoloration of about 50%.

A polyurethane foam was prepared from polyethylene ether glycol having a molecular weight of 1500, tolylene 2,4-diisocyanate and water. The resultant foam was treated with a 5% benzene solution of butyl mono-isocyanate containing 1% methylmorpholine, at 40° C. for one hour. With this treatment, the rate of yellowing was reduced by a factor of about three.

Having thus disclosed my invention, I claim as new and desire to protect by Letters Patent:

1. A method of reducing the rate of discoloration of a formed polyurethane foam product upon exposure to air and light, which consists in subjecting at least the surface portions of said foam product to the action of an organic mono-isocyanate.

2. A method as in claim 1 wherein said mono-isocyanate is applied to the foam as a vapor within an enclosed chamber.

3. A method as in claim 1 wherein said mono-isocyanate is dissolved in an organic solvent.

4. A method as in claim 1 wherein said mono-isocyanate is aliphatic and a tertiary base catalyst is admixed with said mono-isocyanate.

5. A method as in claim 1 wherein said polyurethane foam is of the polyester type.

6. A method as in claim 1 wherein said polyurethane foam is of the polyether glycol type.

7. A formed polyurethane foam product which is the product of method claim 1.

8. A method of reducing the rate of discoloration of a formed polyurethane foam product upon exposure to air and light, which consists essentially in impregnating the foam product with a solution of an organic mono-isocyanate in an organic solvent inert with respect to the mono-isocyanate, washing the impregnated foam product with organic solvent to remove residual, unreacted mono-isocyanate, and drying the washed foam product.

References Cited in the file of this patent

UNITED STATES PATENTS

| | | |
|---|---|---|
| 2,577,381 | Stirnemann | Dec. 4, 1951 |
| 2,602,783 | Simon | July 8, 1952 |